US010937310B2

(12) United States Patent
Mueck et al.

(10) Patent No.: US 10,937,310 B2
(45) Date of Patent: Mar. 2, 2021

(54) CONTROL DEVICE AND METHOD FOR CONTROLLING A VEHICLE

(71) Applicant: Intel IP Corporation, Santa Clara, CA (US)

(72) Inventors: Markus Dominik Mueck, Unterhaching (DE); Dario Sabella, Munich (DE); Ingolf Karls, Feldkirchen (DE); Honglei Miao, Munich (DE); Leonardo Gomes Baltar, Munich (DE); Yang Yang, Mannheim (DE); Miltiadis Filippou, Munich (DE); Mustafa Emara, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/857,676

(22) Filed: Dec. 29, 2017

(65) Prior Publication Data
US 2019/0051151 A1 Feb. 14, 2019

(51) Int. Cl.
*G08G 1/005* (2006.01)
*G08G 1/01* (2006.01)
*B60W 10/04* (2006.01)
*B60W 40/04* (2006.01)
*B60W 50/16* (2020.01)

(52) U.S. Cl.
CPC .............. *G08G 1/012* (2013.01); *G08G 1/005* (2013.01); *G08G 1/0116* (2013.01); *G08G 1/0145* (2013.01); *B60W 10/04* (2013.01); *B60W 40/04* (2013.01); *B60W 50/16* (2013.01); *B60W 2420/52* (2013.01); *B60W 2554/00* (2020.02); *B60W 2720/10* (2013.01)

(58) Field of Classification Search
None
See application file for complete search history.

(56) References Cited

U.S. PATENT DOCUMENTS

| 6,185,314 | B1* | 2/2001 | Crabtree | G01S 3/7865 |
| | | | | 348/169 |
| 9,842,500 | B1* | 12/2017 | Prasad | G08G 1/162 |
| 2008/0071465 | A1* | 3/2008 | Chapman | G01C 21/3691 |
| | | | | 701/117 |
| 2009/0075677 | A1* | 3/2009 | Seger | G08B 21/0261 |
| | | | | 455/456.6 |
| 2011/0210866 | A1* | 9/2011 | David | G08G 1/166 |
| | | | | 340/903 |

(Continued)

OTHER PUBLICATIONS

Guenther et al., "Collective perception and decentralized congestion control in vehicular ad-hoc networks", Oct. 27, 2016, 10th Car-2-Car Forum, Gaydon.

(Continued)

*Primary Examiner* — Redhwan K Mawari
*Assistant Examiner* — Melanie J Patrick
(74) *Attorney, Agent, or Firm* — Viering, Jentschura & Partner mbB

(57) ABSTRACT

A control device of a vehicle control system is described comprising a receiver configured to receive traffic environment information, a processor configured to determine a reliability for the traffic environment information and a controller configured to generate a command signal for a vehicle based on the traffic environment information and the reliability.

20 Claims, 8 Drawing Sheets

(56) References Cited

U.S. PATENT DOCUMENTS

| | | | | |
|---|---|---|---|---|
| 2012/0265439 | A1* | 10/2012 | Radner | G01C 21/00 |
| | | | | 701/468 |
| 2013/0148513 | A1* | 6/2013 | Szabo | H04L 41/142 |
| | | | | 370/252 |
| 2014/0219505 | A1* | 8/2014 | Kindo | G06K 9/00805 |
| | | | | 382/103 |
| 2015/0210258 | A1* | 7/2015 | Erdem | B60T 8/885 |
| | | | | 701/29.2 |
| 2016/0342906 | A1* | 11/2016 | Shaashua | G06N 20/00 |
| 2017/0064515 | A1* | 3/2017 | Heikkila | H04W 4/043 |
| 2017/0094450 | A1* | 3/2017 | Tu | H04W 4/029 |
| 2017/0166218 | A1* | 6/2017 | Hoare | B60W 30/06 |
| 2017/0217394 | A1* | 8/2017 | Shima | B60R 21/00 |
| 2018/0245929 | A1* | 8/2018 | Watanabe | H04W 4/40 |
| 2018/0322785 | A1* | 11/2018 | Jerichow | G08G 1/162 |
| 2018/0357560 | A1* | 12/2018 | Di Pietro | G06N 20/00 |
| 2019/0073524 | A1* | 3/2019 | Yi | G06K 9/00348 |
| 2019/0080611 | A1* | 3/2019 | Yamada | G08G 1/166 |
| 2019/0087668 | A1* | 3/2019 | Kim | G08G 1/0967 |
| 2019/0108753 | A1* | 4/2019 | Kaiser | H04W 4/029 |

OTHER PUBLICATIONS

Wikipedia, "Functional Safety", https://en.wikipedia.org/wiki/Functional_safety, retrieved on Dec. 14, 2017.

* cited by examiner

CONTROL DEVICE AND METHOD FOR CONTROLLING A VEHICLE

TECHNICAL FIELD

Exemplary implementations described herein generally relate to control devices and methods for controlling a vehicle.

BACKGROUND

Traffic and vehicle control systems such as those being based on V2X (Vehicle-to-Everything) communication gather information about the traffic environment and share this information between the vehicles. The "X" in "V2X" may be replaced and represent:

V2P/P2V: Vehicle-to-Person/Person-to-Vehicle communication

V2I/I2V: Vehicle-Infrastructure/Infrastructure-to-Vehicle communication

V2V: Vehicle-to-Vehicle Communication and

V2N/N2V: Vehicle-to-Network/Network-to-Vehicle communication.

The goal of V2X communication is to arrive at a "collective perception/cognition" and to solve or avoid hazardous situations jointly among the vehicles. To achieve this, mechanisms are desirable that allow a traffic and vehicle control system to gather information about the traffic environment as completely as possible.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EXEMPLARY IMPLEMENTATION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
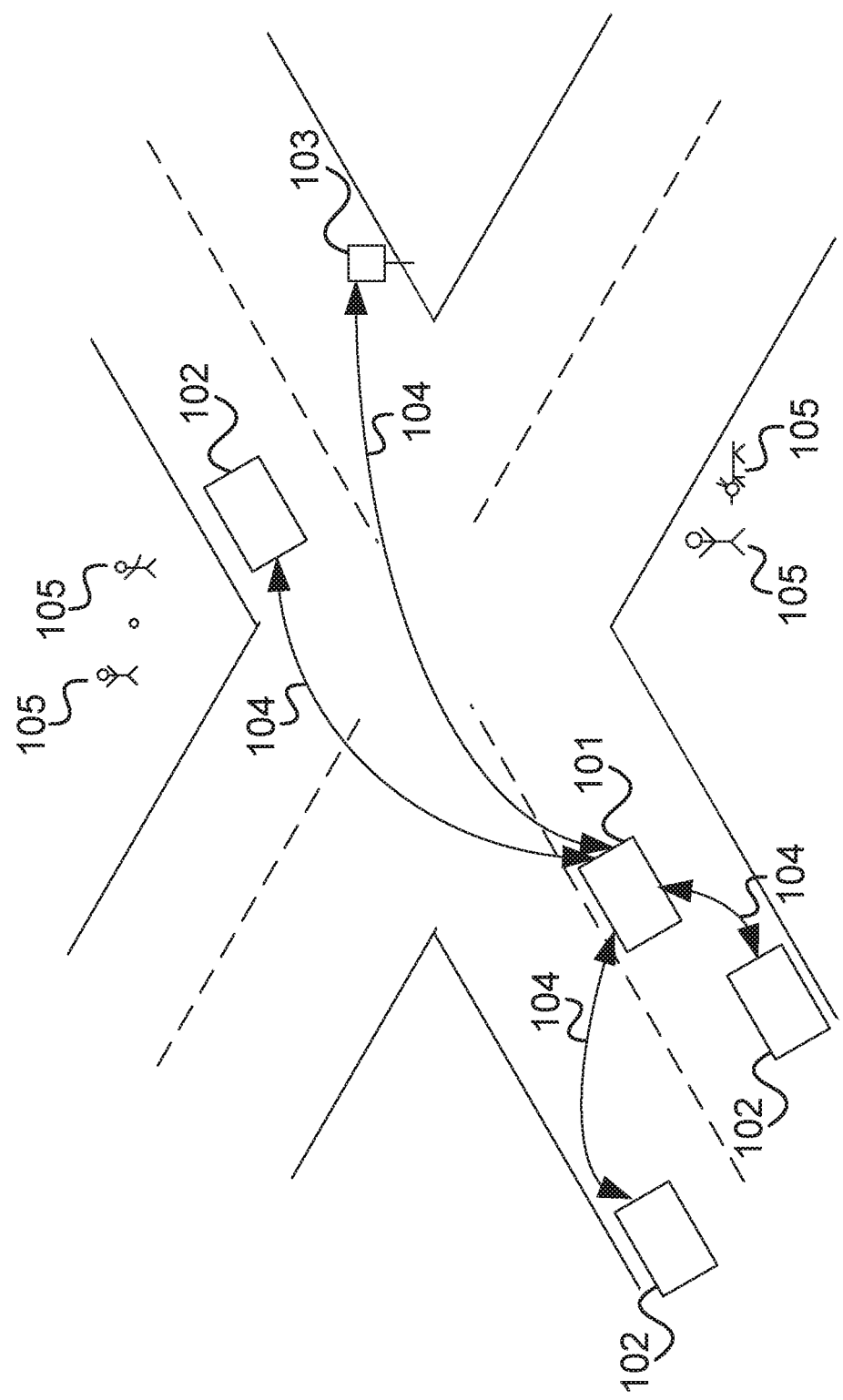
FIG. 1 shows a V2X (Vehicle-to-Everything) communication system.

FIG. 1 shows a V2X (Vehicle-to-Everything) communication system 100.

In the communication environment of a V2X communication system 100, a first vehicle 101 exchanges messages with second vehicles 102 as well as Road-Side Units (RSUs) 103, as illustrated by arrows 104. The messages are exchanged wirelessly by radio communication, e.g. by means of a cellular communication network, e.g. a 5G communication network.

Similarly, the second vehicles 102 may communicate among themselves and the RSUs 103 such that altogether, the devices 101, 102, 103 have a collective perception/cognition which can be defined as a state where different devices are able to share different views of the traffic environment within a specific coverage area.

The V2X system 100 may have various control entities which take decisions based on information about the traffic environment. For example, a controller in vehicle 101 performs control actions (e.g. automated breaking) or output of alarm signals to its driver based on the information about the traffic environment. As another example, there may be a controller for traffic lights operating based on the information about the traffic environment.

In such a vehicle communication context, there are two types of (periodic and non-periodic) broadcast messages defined:

CAM (Cooperative Awareness Message): CAM is a periodic message used by a ITS (Intelligent Transport System (ITS) station (car, traffic sign, closure of a road/track, etc.) to indicate its presence ("I am a car, I am here", i.e., its position, velocity, direction, size, type (i.e., emergency vehicle, bus) etc.). The Cooperative Awareness Messages (CAMs) are distributed and provide information of presence, positions as well as basic status of communicating ITS stations to neighboring ITS stations that are located within a single hop distance. All ITS stations shall be able to generate, send and receive CAMs, as long as they participate in V2X networks. By receiving CAMs, the ITS station is aware of other stations in its neighborhood area as well as their positions, movement, basic attributes and basic sensor information. At receiver side, reasonable efforts can be taken to evaluate the relevance of the messages and the information. This allows ITS stations to get information about its situation and act accordingly.

DENM (Decentralized Environmental Notification Message): DENM is a non-periodic message used to indicate that some event occurs, e.g., a car may indicate that it suddenly breaks, or that it is stuck at an intersection, a traffic sign may indicate that the road is slippery, etc. Decentralized Environmental Notification Messages (DENMs) are mainly used by the Cooperative Road Hazard Warning (RHW) application in order to alert road users of the detected events. The RHW application is an event-based application composed of multiple use cases. The general processing procedure of a RHW use case is as follows:

Upon detection of an event that corresponds to a RHW use case, the ITS station immediately broadcasts a DENM to other ITS stations located inside a geographical area and which are concerned by the event.

The transmission of a DENM is repeated with a certain frequency.

This DENM broadcasting persists as long as the event is present. (According to the type of the detected event, the DENM broadcasting can be realized by the same ITS station, temporarily realized by one or several ITS station(s), or relayed by one or several ITS station(s).)

The termination of the DENM broadcasting is either automatically achieved once the event disappears after a predefined expiry time, or by an ITS station that generates a special DENM to inform that the event has disappeared.

ITS stations, which receive the DENMs, process the information and decide to present appropriate warnings or information to users, as long as the information in the DENM is relevant for the ITS station.

In the following, embodiments are described where the above list of message types is extended and a corresponding Graphical User Interface (GUI) based information management and control is introduced in order to enable collective perception among vehicles 101, 102 and other traffic participants 105. For example, a message of the type CPM (Collective Perception Message) is introduced which the vehicles 101, 102 use to exchange observations on dynamic environment changes between themselves (e.g. about the other traffic participants such as pedestrians crossing the road, kids playing next to the road, dogs, etc.).

Embodiments thus allow objects in motion (such as vehicles, humans or even animals)—as dynamically moving participants to the overall traffic environment—to provide individual data about the traffic environment to a decision making entity of the V2X system.

For example, a dog (or a child) has an IoT (Internet of Things) bracelet distributing data to the V2X system 100 by means of radio communication such as i) presence of the dog, ii) current motion direction, iii) a-priori information of statistical behavior (e.g., does the dog sometimes run abruptly onto the street, etc.).

A further example is the use of information from a number of pedestrians to optimize the traffic flow. For example, when many children are going to school at the same time, depending on their number and at which speed they approach a traffic light, the timing of the light can be optimized or drivers may get suggestions how to deviate from busy traffic lights.

Further, an ambulance may broadcast information related to an emergency situation (i.e., approach a point of car crash), in a way that vehicles moving on the same trajectory start following an alternative route. Also the duration of traffic light signals can be modified accordingly to enable the emergency vehicle approach the accident site as fast as possible.

Thus, IoT devices may be provided to provide human/animal behavioral (context) data to the V2X system 100 with the aim of guaranteeing the exchange of at least a minimum amount of data allowing the V2X system 100 to create a cooperative perception of the traffic environment. A graphical user interface (GUI) may be provided to enable a user to control what kind of user's context relevant data shall be provided to the V2X system (e.g., age of a child, movement direction, speed, location, etc.).

Compared to a V2X ecosystem where humans, especially children, and animals need to be detected passively through systems such as vehicular RADAR/LIDAR (radio/light detection and ranging), etc., the above mechanism to allow humans/animals to actively (or proactively) and directly provide information about their presence/activity to the V2X system allows collecting more reliable, less delayed, less erroneous and more complete information (e.g. less focused on areas where only a few collaborating nodes exist). According to the above mechanism, the V2X system may obtain precise information from other traffic participants 105 (like humans/animals dynamically entering/moving away from the V2X ecosystem).

According to various embodiments, information provided to the V2X system in this way may be provided with a reliability indicator which is taken into account by control entities taking decisions based on the information. For example, a reliability assigning entity (which may be included or separate from the control entities) may associate information with a reliability. For example, the possibility may be taken into account that an IoT device provides falsified information to the V2X system or that an information is statistical (such as a probability that a child is running on the street).

Figure 2:
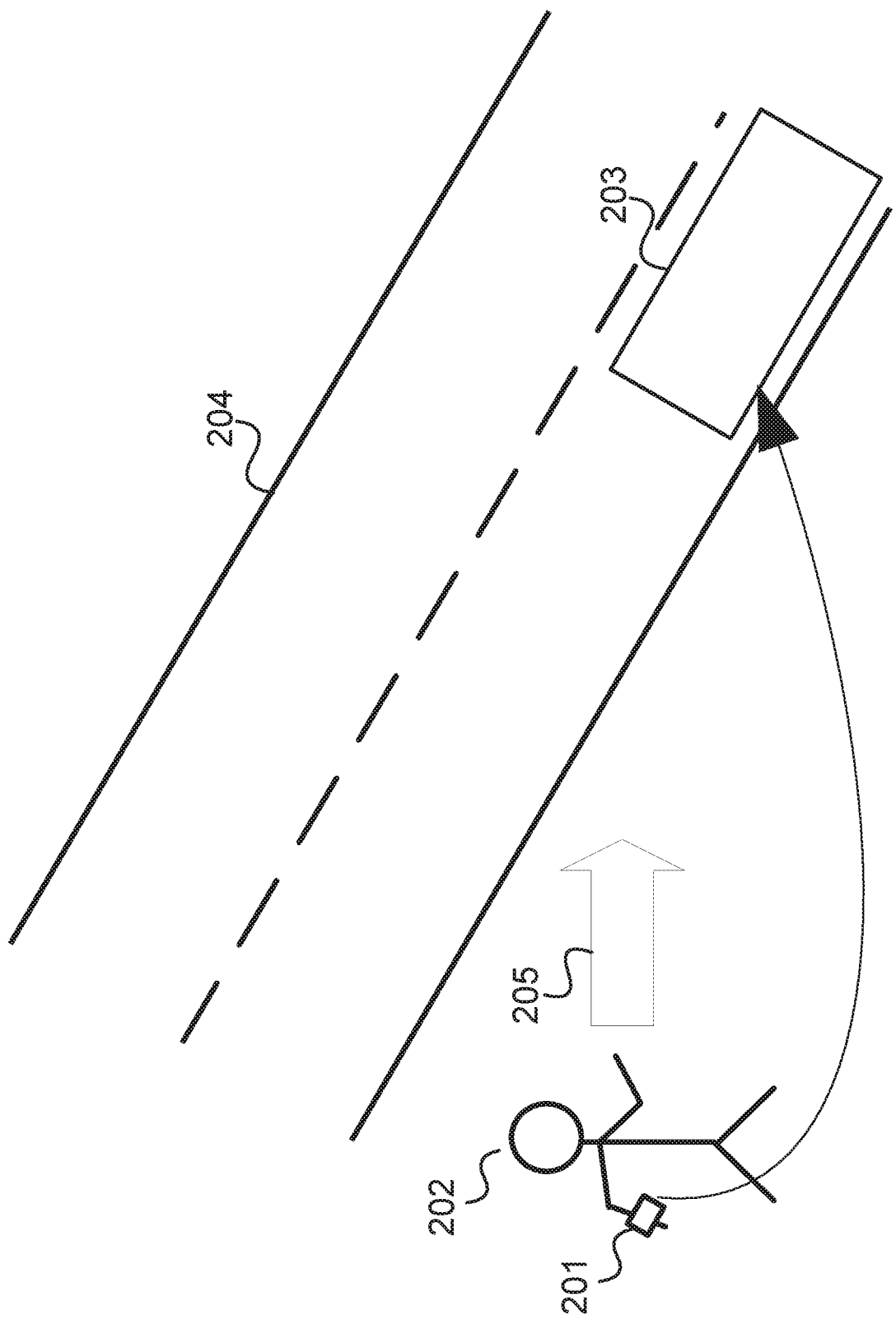
FIG. 2 illustrates the communication of traffic environment information between an IoT (Internet of Things) device of a traffic participant or vulnerable road user (VRU) and a vehicle.

FIG. 2 illustrates the communication of traffic environment information between an IoT device 201 of a traffic participant or vulnerable road user (VRU) 202 and a vehicle 203 (which is part of a V2X system).

The traffic participant (VRU) 202 is for example a human or an animal. For example, the traffic participant 202 is a child moving in the direction of the street 204 as illustrated by arrow 205 but the IoT device 201 sends information about this to the vehicle 203 as illustrated by arrow 206 such that a control device in the vehicle 203 can anticipate the immediate danger and perform a corresponding action such as reduce the velocity of the vehicle 203 or output a warning signal to the driver.

The IoT device 201 may generally be any type of wireless equipment. The IoT device 201 may for example be one of the following (non-exhaustive) list:

IoT Watch (SmartWatch)
IoT Health device, such as a Health wrist device
IoT Sports device, such as a Sports tracker (which tracks thenumber of steps, distance, etc.)
IoT device embedded in clothing
IoT device embedded in an accessory, such as in glasses, in a handbag, in abackpack, etc.
IoT feature in a Smartphone or any other wireless telephone, including a 2G phone, a 3G phone, a 4G phone, a DECT phone or a combination thereof,
Programme Making and Special Events (PMSE) device, such as a wireless microphone, The IoT device 201 may allow its users to appropriately select the level of information to be shared with the V2X system through a suitable Graphical User Interface (GUI). The IoT device 201 measures and gathers context relevant data on its user (person or animal) who is carrying it under the control of the user.

The IoT device 201 provides traffic environment information related to a coverage area of the V2X system (i.e. the controlled area of the V2X system) to the V2X system. The V2X system then takes the information into account in order to operate vehicles. For example, a control entity located in the vehicle 201 may execute a sudden stop of the vehicle 201 if the child 202 runs into the street.

The traffic environment information sent (e.g. broadcast) by an IoT device 201 may include the one or more of the following information and may for example be structured in the following manner:

Source ID (e.g. device manufacturer)
User Type (Human, Animal, Object)
User characteristics (height, weight, size)

Age or related information: Baby, child, teenager, adult, elderly, etc.

Weather conditions (ice, snow, water, etc. . . . )

Environment temperature, smoke levels (particularly useful when considering Search&Rescue use cases)

Current activity descriptor of user (e.g. walking, running, cycling, playing soccer on the street, etc. . . . )

Further characteristics of activity (speed, direction, position). A related accuracy (or confidence class) associated to these measures may also be indicated. As an example, location can be estimated by means of different technologies (GPS, Cellular, Wifi, . . . ), each one with its own confidence. A simple lookup table could define confidence classes, so that this code can be inserted in the data model, and the receiving entity can associate the measure to the correct confidence (i.e. accuracy or reliability).

Statistical behavior:
  Statistical information about the behavior of the user 202 may be gathered (e.g. by the IoT device 201) over a long observation period (e.g. days, weeks, months or years). For example, an animal may have the characteristic that it suddenly starts running into the street. The IoT device 201 may provide the related statistical information to the V2X system.
  Example information encoding:
    i. Number of statistical characteristics (a positive scalar)
    ii. Characteristic "x": A type among a predefined set, e.g. "suddenly stops when moving", "suddenly moves when not in motion", "suddenly runs after a ball on the street", etc.
    iii. Probability of event "x" occurring (probability level)
  This statistical information (or a portion of that) can be generated by one or several entities of the V2X system (including the IoT device 201), or even processed or stored in a cloud given the other data of the traffic participant 202.

Figure 3:
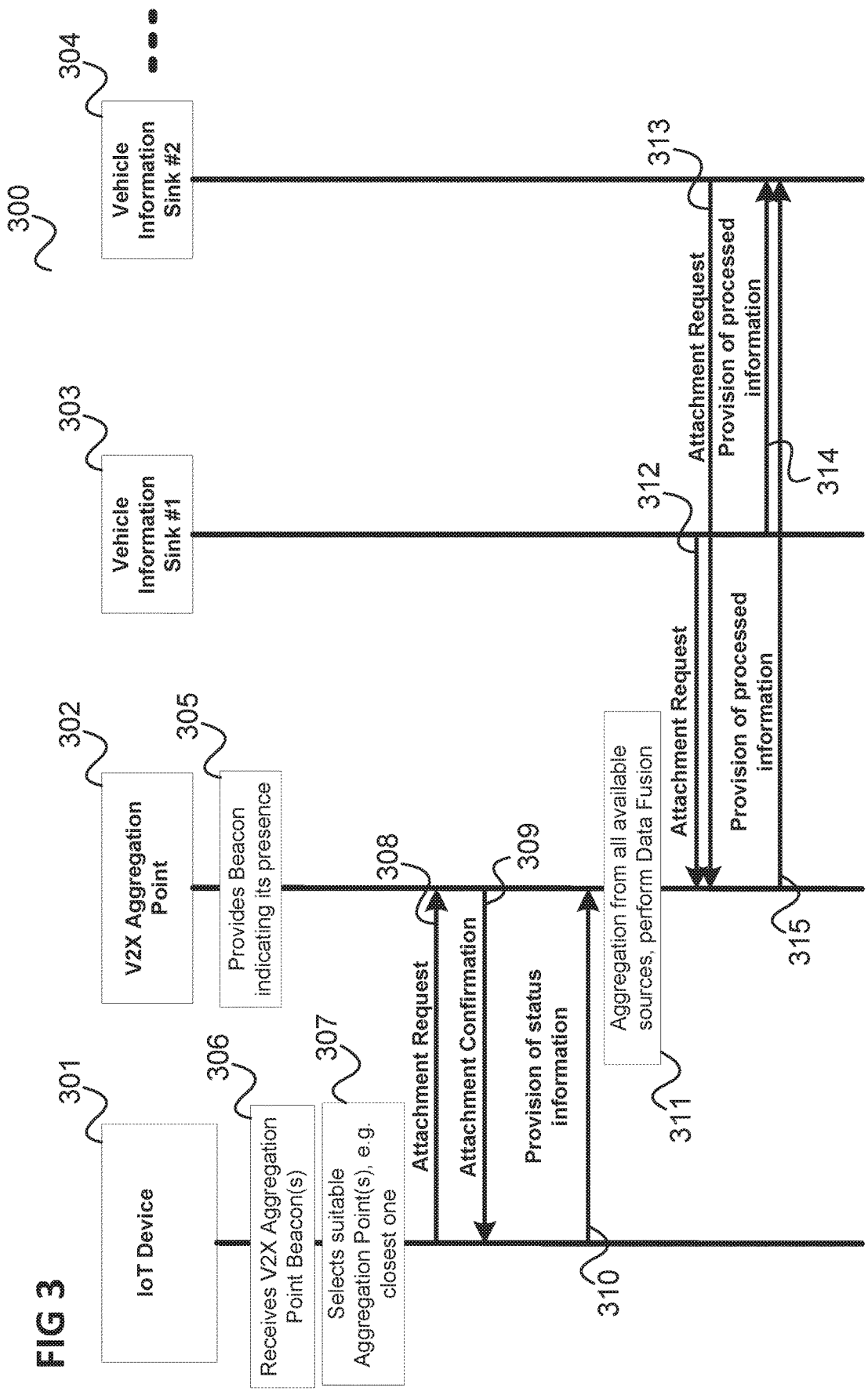
FIG. 3 shows a message flow diagram illustrating an information exchange between an IoT device and a V2X system.

FIG. 3 shows a message flow diagram 300 illustrating an information exchange between an IoT device and a V2X system.

The message flow takes place between an IoT device 301 (e.g., a bracelet of a dog, a device carried by a child or pedestrian etc.), a V2X information aggregation component 302 (e.g. in a traffic light, inside a vehicle, etc.) and two (or more) information sinks 303, 304 (e.g. a control device of a vehicle). A control device in a vehicle may also act as the V2X information aggregation component 302.

In 305, the V2X information aggregation component 302 broadcasts a beacon indicating its presence. The IoT device 301 receives the beacon in 306.

In 307, the IoT device 301 selects a V2X information aggregation component. It is assumed that it selects the V2X information aggregation component 302, e.g. because it is the closest one.

In 308, the IoT device 301 sends an attach request to the V2X information aggregation component 302. The V2X information aggregation component 302 confirms attachment of the IoT device 301 in 309.

In 310, the IoT device 301 provides traffic environment information, e.g. status information about itself (such as speed, its type (type of information source), etc.) to the V2X information aggregation component 302.

In 311, the V2X information aggregation component 302 aggregates traffic environment information from all available sources and provides data fusion. This may also include associating a reliability with the various information elements, e.g. depending on the source of the corresponding information, the type of the information (e.g. whether it is statistical or not), the measurement type used for determining the information etc.

The vehicle information sinks 303, 304 may then attach themselves to the V2X information aggregation component 302 in 312 and 313 and are provided by the V2X information aggregation component 302 with processed traffic environment information in 314 and 315.

The user 202 can manage the level of information to be provided to the V2X system by means of an appropriate GUI (graphical user interface). Such an information management environment can be either
  directly accessed on the target device, i.e. the IoT device (e.g., a smartphone is providing information to the V2X system and is configured through an application or similar)
  indirectly accessed, for example an IoT device (such an IoT enabled bracelet for a child or a dog) is programmed through a directly connection to a smartphone, laptop or similar.

A corresponding GUI may for example have the following characteristics:
  It provides a list of information which can be provided to the V2X system and allows the user to choose the level of information to be provided (or none at all).
  It allows the user to select conditions under which the information is provided (e.g., anytime or whenever the battery level is sufficiently high or only in the context of dense traffic, at specific times of the day (i.e., working or commuting hours, etc.)).

Figure 4:
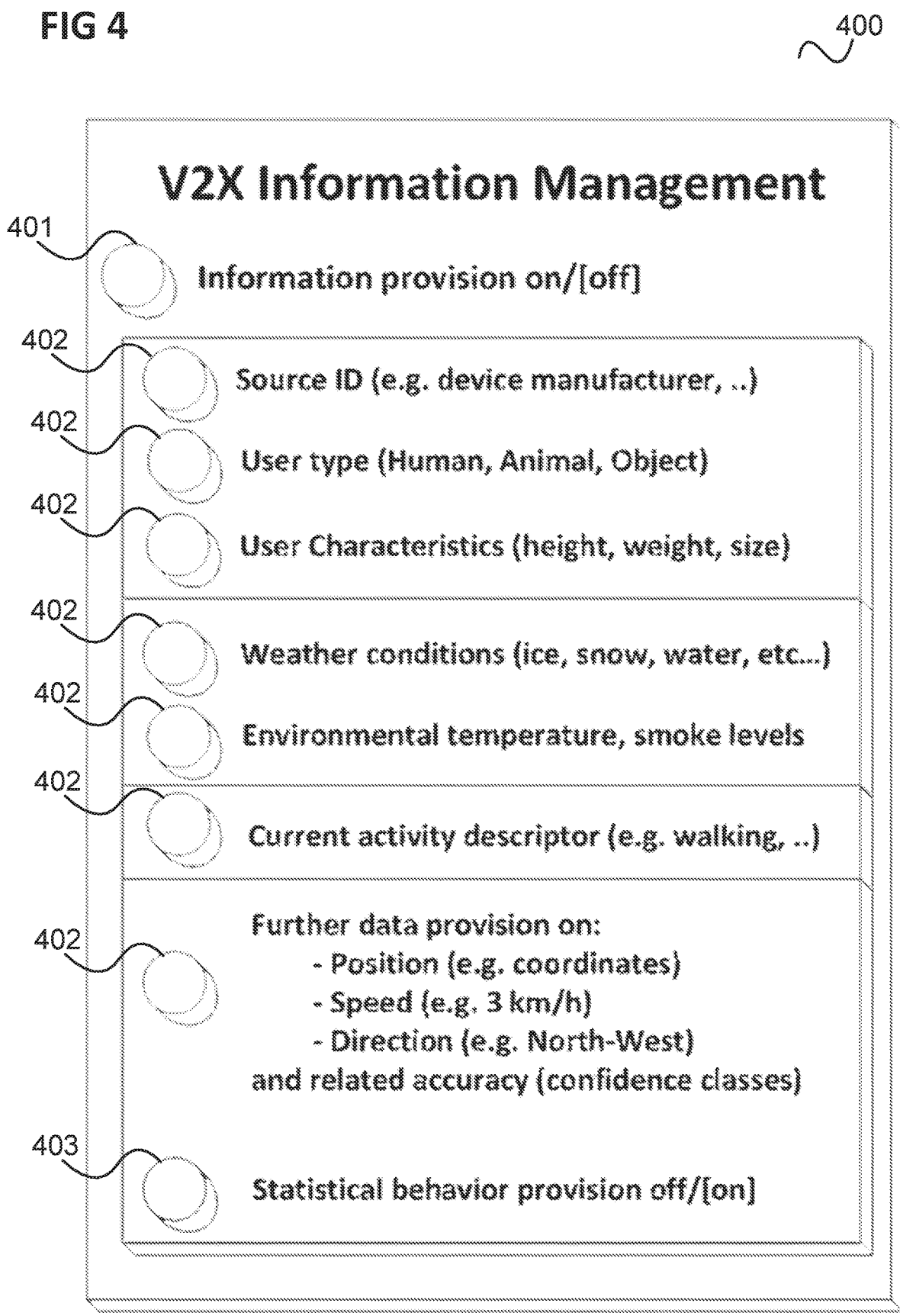
FIG. 4 shows a graphical user interface for controlling information provision by an IoT device.

FIG. 4 shows a graphical user interface 400 having a first button 401 for activating and deactivating information provision by the IoT device, second buttons 402 for selecting, for different information types, whether the IoT device should provide them and a third button 403. The buttons for example change color (e.g. between red and green) depending on whether the corresponding option is turned on or off.

Figure 5:
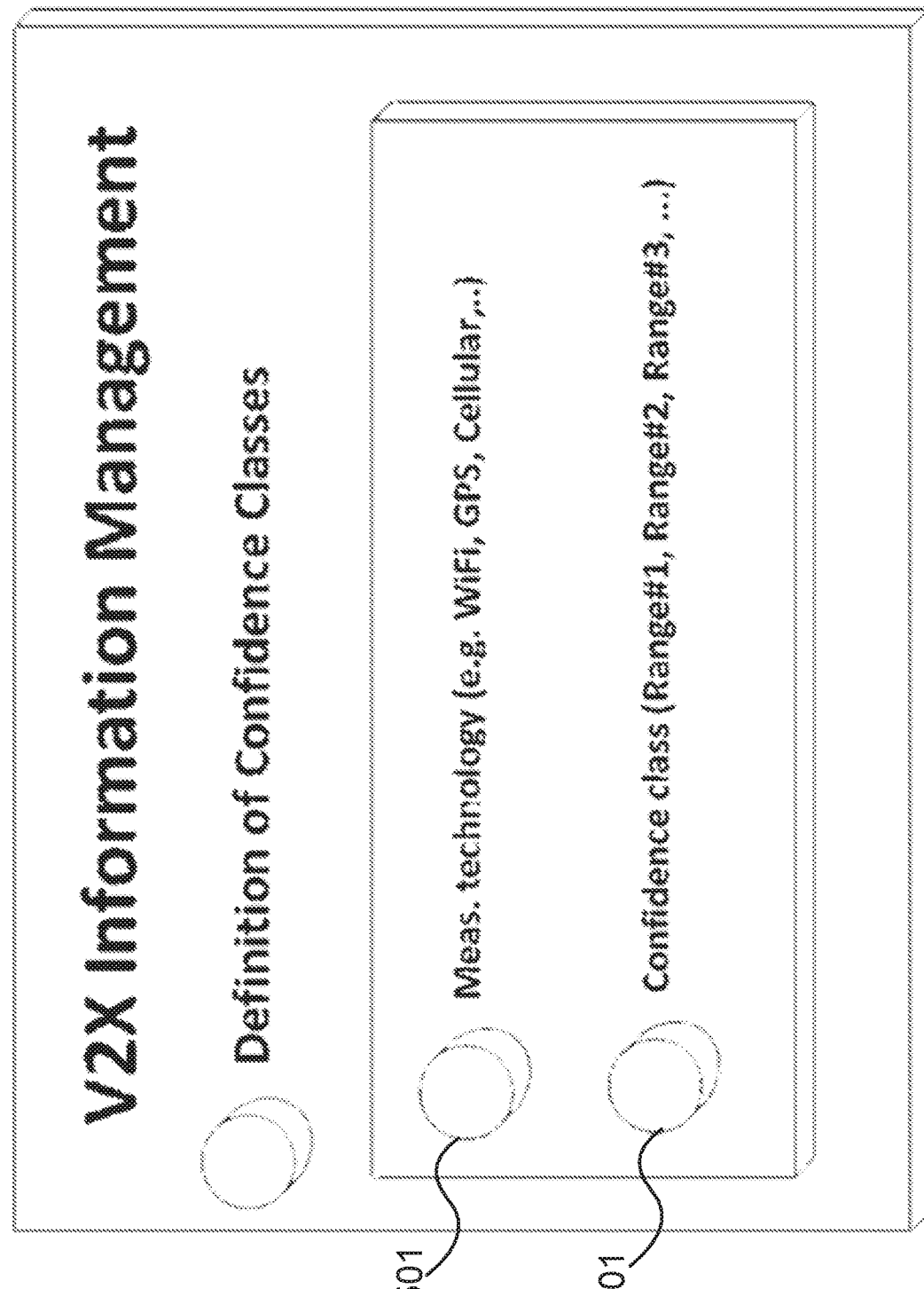
FIG. 5 shows a graphical user interface allowing a user to define confidence classes for traffic environment information.

FIG. 5 shows a graphical user interface 500 allowing the user to define confidence classes (e.g. corresponding to a lookup table) for data provision on position, speed and direction (depending on the technology adopted by the sensor/device).

Buttons 501 allow the user to select a measurement technology and define a corresponding confidence class.

Figure 6:
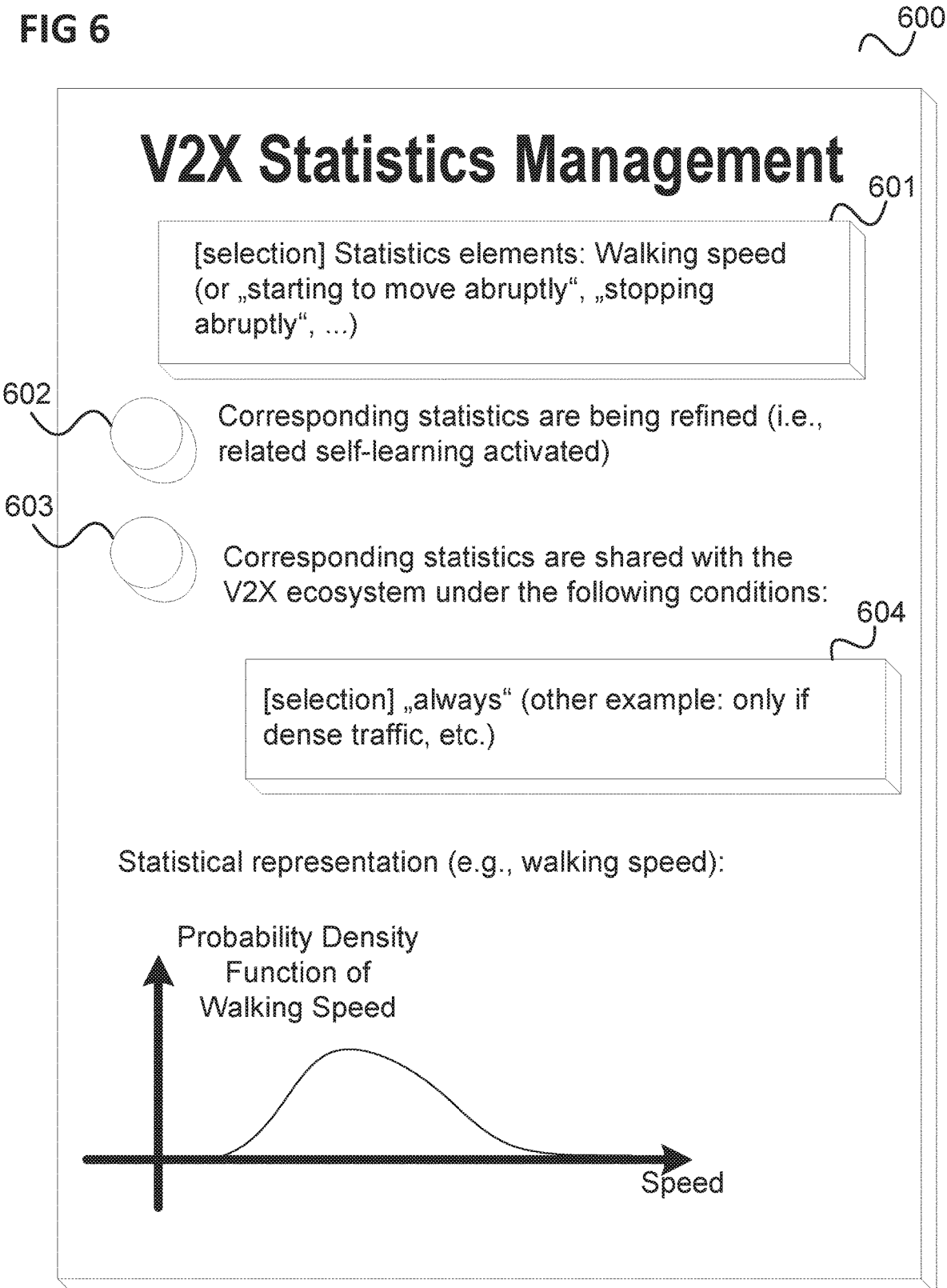
FIG. 6 shows a graphical user interface allowing a user to manage statistical traffic environment information.

FIG. 6 shows a graphical user interface 600 allowing the user to manage statistical information.

A first button 601 allows a user to select a statistical information. A second button 602 allows activation whether corresponding statistics are refined. A third button 603 allows activating that the selected statistical information is shared under certain conditions which may be selected by means of a fourth button 604.

The processing of information received by a sink (destination, e.g. a control device in a vehicle) may depend on the fact whether the source (e.g. an IoT device) was designed and creates information in accordance with functional safety requirements. According to one embodiment, a tag is included into any type of V2X information indicating whether the information is from a functional safety compliant source or not. If the information is from a functional safety compliant source, the information may typically be used to implement automated actions by a vehicle (e.g., automated breaking, etc.). If the information is not from a functional safety compliant source, it may only be allowed to provide a warning to the driver but no automated action without human intervention may be possible based on the information. This may depend on locally applicable regulation and may differ from country to country.

The objective of functional safety is freedom from unacceptable risk of physical injury or of damage to the health of people either directly or indirectly (through damage to property or to the environment). In the context of automotive systems, it is expected that specific V2X functionalities and services should be designed based on functional safety principles while other V2X functionalities and systems may not require compliance to functional safety requirements. In practice, it typically depends whether a certain function and service may lead to unacceptable risk of physical injury or of damage to the health of people either directly or indirectly or not. For example, some automated emergency breaking features may require compliance to functional safety principles while entertainment features may not.

According to various embodiments, in context of provision of traffic environment information, the following may be included:

Any specific function, service, component, building block, etc. has a tag which indicates whether it is functional safety relevant or not. For example, a physical (e.g. red colored) or logical (e.g. "0" or "1") functional safety tag may indicate that functional safety principles must be met (such as auditing of the feature, inclusion of redundancy, etc.). A physical (e.g., green colored) or logical (e.g., "1" or "0") functional safety tag (or no tag at all) may indicate that functional safety principles are not required to apply.

The following cases for a specific function, service, component, building block, etc. may be distinguished: functional safety requirements apply (e.g., red tag)

Automated decision making features may not be applicable here or may only apply in a very narrow pre-defined scope (e.g., selection among pre-defined and configurations, e.g. acceleration/breaking within certain limits, etc.).

In case that the functional safety implementation relies on several redundancy information sources, the information may be used in such a way that always a single piece of information is only used to a reasonable extend and cannot trigger an action by the vehicle alone. Only a multitude of messages from multiple distinct sources indicating the same requirement would trigger such an action.

No functional safety requirements apply

In case that functional safety requirements do not apply, the information may still be used for non-safety critical applications, for example for an in-vehicle infotainment system.

Figure 7:
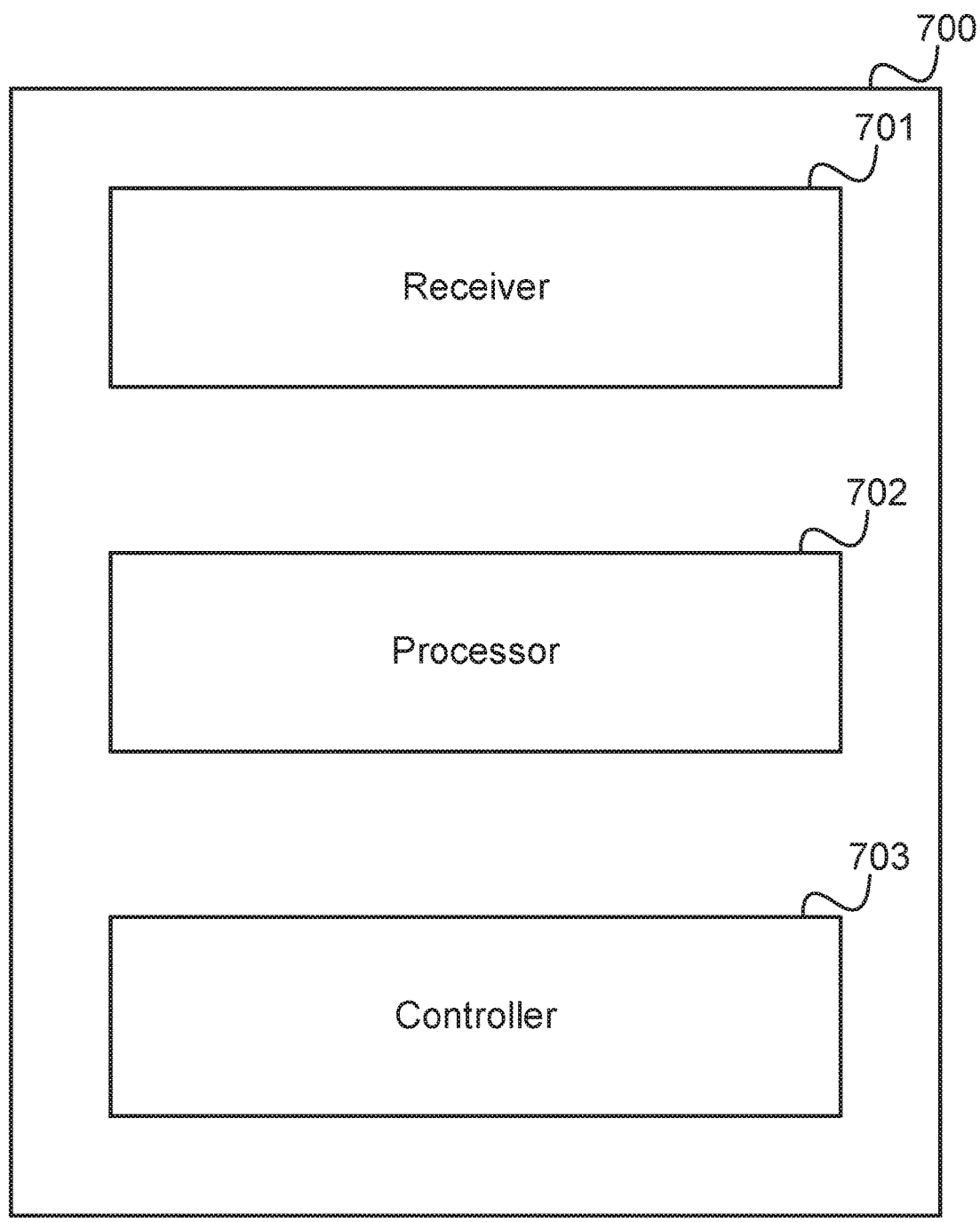
FIG. 7 shows a control device of a vehicle control system.

In summary, according to various embodiments, a control device is provided as illustrated in FIG. 7.

FIG. 7 shows a control device 700 of a vehicle control system.

The control device 700 includes a receiver 701 configured to receive traffic environment information.

The control device 700 further includes a processor 702 configured to determine a reliability for the traffic environment information.

Further, the control device 700 includes a controller 703 configured to generate a command signal for a vehicle based on the traffic environment information and the reliability.

According to various embodiments, in other words, a vehicle control system, e.g. a V2X system, incorporates traffic environment information taking its reliability into account. For example, information from an external device, i.e. a device not belonging to the V2X system, i.e. a communication device that is not associated with a vehicle, a traffic sign etc., such as a personal communication device of a person, may be considered by the V2X system to have a reduced reliability compared to information generated by components of the V2X system (e.g. vehicle-mounted control devices registered in the V2X system). This allows incorporating information from external devices while reducing the risk that there is negative impact on the operation of the V2X system by unreliable or falsified information from an external source.

The controller may for example only generate a command that directly affects the control of the vehicle if the traffic environment information based on which it decides to generate the command has a certain reliability (e.g. when the reliability, expressed as a numeric reliability level, is above a reliability threshold). This means that the controller may differentiate, based on the reliability of traffic environment information whether i) the command signal leads to output information (e.g. a warning) only to the driver and the driver decides on the final action or ii) the command signal is provided to some digital decision making in the vehicle and leads to an automatic use of the corresponding traffic environment information and its processing in order to implement some action (e.g., automated breaking, etc.).

Thus, depending on the reliability, the command may have direct influence onto the actions performed by the vehicle without human intervention (e.g., decelerate, accelerate, break, use horn, etc.) or may require human intervention to have influence on, e.g., the speed of the vehicle.

Thus, IoT Users may be enabled to provide information to a V2X system, e.g. with a focus on dynamic behavior (e.g., crossing a road, playing next to roadside, etc.). According to one embodiment, a IoT user may select (e.g. by means of a GUI) the appropriate level of information to be shared with the V2X system (e.g., user speed, typical behavioral patterns, etc.).

Information with a low reliability may for example be ignored or assigned a lower weight than information with a high reliability in a decision process, e.g. when deciding whether to display a warning to a driver or whether to reroute traffic or changing the timing of traffic lights.

The traffic environment information may have a tag indicating the reliability level, e.g. a number in a given range. For example, the range could be 0 . . . 10 where 0 corresponds to a low level of reliability and 10 corresponds to the highest level of reliability. This reliability level may be assigned in a fixed way, e.g. depending on the type of source (e.g. a sports wrist device may have a lower reliability compared to a professional sensing device, etc.). The reliability level may also be dynamically assigned depending on the circumstances of the device (e.g. it may depend on whether the behavior of the person is erratic (which may imply a low reliability) or very reasonable (which may imply a high reliability). In all cases mentioned in this bullet point, the reliability level is determined by the source.

The reliability level may also be determined by the destination. For example, a vehicle receives data from a Vulnerable Road User and determines how reliable this information could be compared to professional sensors, for example provided by sensors in other vehicles. The reliability level applied by the sink (destination) can for example depend on the quality of the sensing devices, e.g. an expensive premium-brand device may be considered to be highly reliable while a low-value brand device may be considered less reliable. Also, the sink (destination) may apply self-learning and identify which devices finally provide accurate information and which not. The next time that a device is providing information, these learnings are taken into account to determine the reliability. This may finally lead to a hierarchy approach, e.g. there is a hierarchy of device types or device brands and depending on the hierarchy level, the sink chooses a high or low level of reliability.

The reliability may also depend on a combination of reliability information from the source as well as the reliability considerations in the sink (i.e. the destination). Both the sink and the source may express the reliability by means of a respective value. The two values can for example be combined through simple addition and then applying a division by two.

The control device, which is e.g. installed in a vehicle, may further forward the traffic environment information to other nodes, e.g. other vehicles, infrastructure, network, etc. This forwarding may be done prior to any processing (i.e., raw data may be forwarded) or after processing (i.e., data is processed and then forwarded, e.g. multiple sources of multiple distinct reliability levels are being combined and then result or intermediate result is being forwarded to another node).

The components of the control device may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The control device may for example be at least partially be implemented by a transceiver may for example be at least partially implemented by a modem (e.g. an LTE modem), a baseband processor or other transceiver components.

The communication of the traffic environment information, e.g. the reception of the traffic environment information by the control device or the transmission of the traffic environment information from a IoT device may be carried out using one or more radio links.

Any of the radio links mentioned herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.].

Some of the features in this document are defined for the network side, such as Access Points, eNodeBs, etc. Still, a User Equipment (UE) may take this role as well and act as an Access Points, eNodeBs, etc. I.e., some or all features defined for network equipment may be implemented by a UE.

Figure 8:
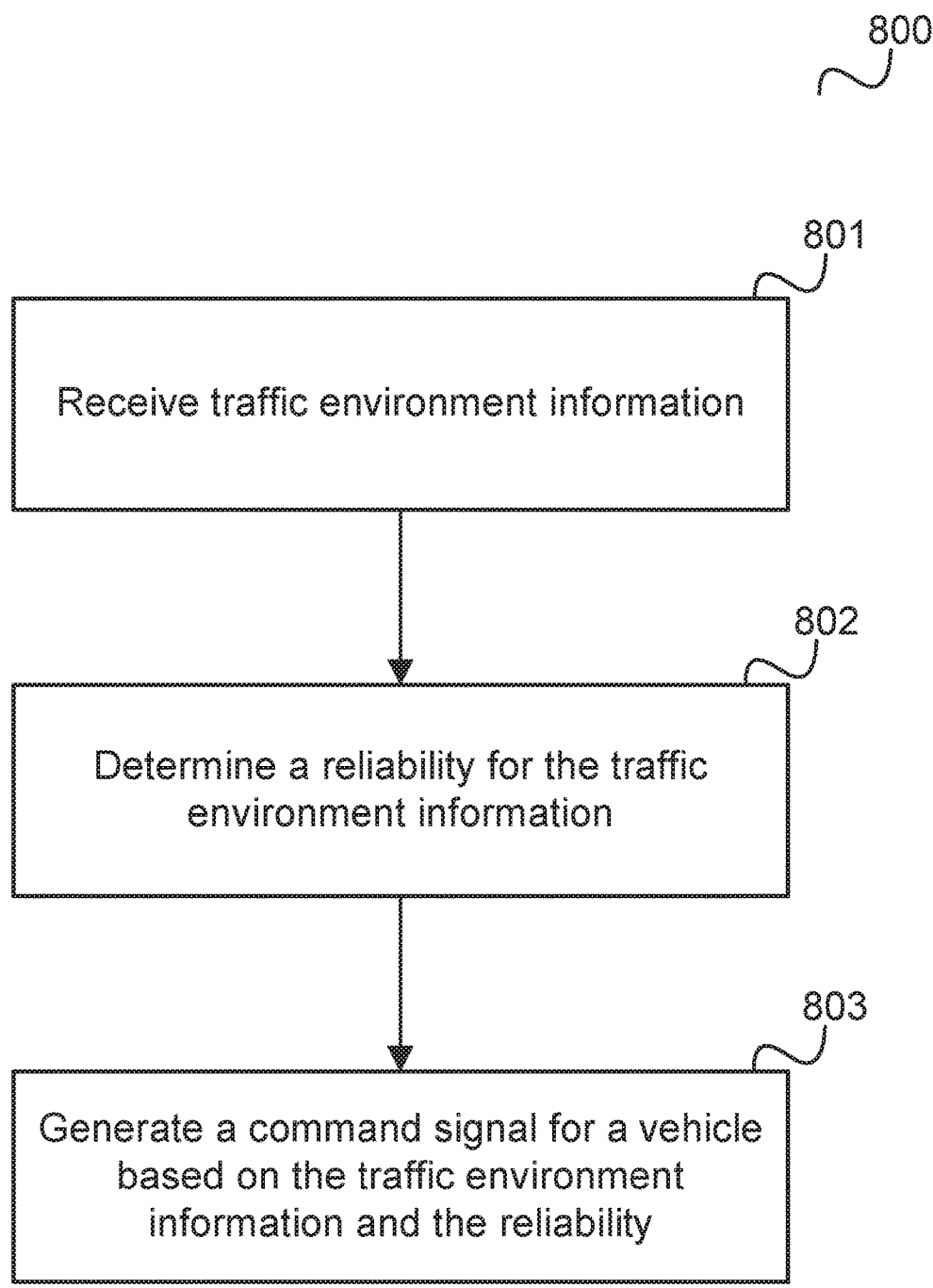
FIG. 8 shows a flow diagram illustrating a method for controlling a vehicle, for example carried out by a control device.

The control device 700 for example carries out a method as illustrated in FIG. 8.

FIG. 8 shows a flow diagram 800 illustrating a method for controlling a vehicle, for example carried out by a control device.

In 801, the control device receives traffic environment information.

In 802, the control device determines a reliability for the traffic environment information.

In 803, the control device generates a command signal for a vehicle based on the traffic environment information and the reliability.

The following examples pertain to further exemplary implementations.

Example 1 is a control device of a vehicle control system as illustrated in FIG. 7.

In Example 2, the subject-matter of Example 1 may optionally include the reliability information depending on a source of the traffic environment information.

In Example 3, the subject-matter of any one of Examples 1-2 may optionally include the processor being configured to determine the reliability based on a source of the traffic information.

In Example 4, the subject-matter of any one of Examples 1-3 may optionally include the receiver being configured to receive reliability information specifying the reliability and the processor being configured to determine the reliability based on the reliability information.

In Example 5, the subject-matter of Example 4 may optionally include the receiver being configured to receive the reliability information from a different source than the traffic environment information.

In Example 6, the subject-matter of any one of Examples 1-5 may optionally include the command signal commanding the vehicle to reduce its speed.

In Example 7, the subject-matter of any one of Examples 1-6 may optionally include the command signal commanding the vehicle to display a warning indication for the driver.

In Example 8, the subject-matter of Example 7 may optionally include the warning indication comprising at least one of a tactile, sound or visual signal.

In Example 9, the subject-matter of any one of Examples 1-8 may optionally include the control device being an on-board control device.

In Example 10, the subject-matter of any one of Examples 1-9 may optionally include the control device being a network-side control device.

In Example 11, the subject-matter of any one of Examples 1-10 may optionally include the traffic environment information comprising a measurement result and the processor being configured to determine the reliability based on a type of measurement.

In Example 12, the subject-matter of any one of Examples 1-11 may optionally include the traffic environment information comprising location information and the processor being configured to determine the reliability based on a type of a positioning system used for determining the location information.

In Example 13, the subject-matter of any one of Examples 1-12 may optionally include the receiver being configured to receive a first set of traffic environment information and a second set of traffic environment information, the processor being configured to determine a first reliability for the first set of traffic environment information and a second reliability for the second set of traffic environment information, wherein the first reliability is different from the second reliability, and the controller being configured to generate the command signal based on the first set of traffic environment information, the second set of traffic environment information, the first reliability and the second reliability.

In Example 14, the subject-matter of any one of Examples 1-13 may optionally include the determiner being configured to determine the reliability based on whether the traffic environment information has a functional safety tag.

Example 15 is a method for controlling a vehicle as illustrated in FIG. 8.

In Example 16, the subject-matter of Example 15 may optionally include the reliability information depending on a source of the traffic environment information.

In Example 17, the subject-matter of any one of Examples 15-16 may optionally include determining the reliability based on a source of the traffic information.

In Example 18, the subject-matter of any one of Examples 15-17 may optionally include receiving reliability information specifying the reliability and determining the reliability based on the reliability information.

In Example 19, the subject-matter of Example 18 may optionally include receiving the reliability information from a different source than the traffic environment information.

In Example 20, the subject-matter of any one of Examples 15-19 may optionally include the command signal commanding the vehicle to reduce its speed.

In Example 21, the subject-matter of any one of Examples 15-20 may optionally include the command signal commanding the vehicle to display a warning indication for the driver.

In Example 22, the subject-matter of Examples 21 may optionally include the warning indication comprising at least one of a tactile, sound or visual signal.

In Example 23, the subject-matter of any one of Examples 15-22 may optionally be performed by an on-board control device.

In Example 24, the subject-matter of any one of Examples 15-23 may optionally be performed by a network-side control device.

In Example 25, the subject-matter of any one of Examples 15-24 may optionally include the traffic environment information comprising a measurement result and the method comprising determining the reliability based on a type of measurement.

In Example 26, the subject-matter of any one of Examples 15-25 may optionally include the traffic environment information comprising location information and the method comprising determining the reliability based on a type of a positioning system used for determining the location information.

In Example 27, the subject-matter of any one of Examples 15-26 may optionally include receiving a first set of traffic environment information and a second set of traffic environment information, determining a first reliability for the first set of traffic environment information and a second reliability for the second set of traffic environment information, wherein the first reliability is different from the second reliability, and generating the command signal based on the first set of traffic environment information, the second set of traffic environment information, the first reliability and the second reliability.

In Example 28, the subject-matter of any one of Examples 15-27 may optionally include determining the reliability based on whether the traffic environment information has a functional safety tag.

According to a further example, a component of a traffic information gathering system is described comprising a receiver configured to receive information about a traffic situation; a processor configured to assign a reliability to information and a signaling circuit configured to provide the information and an indication of the reliability to a vehicle controller.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A control device of a vehicle control system comprising:
   a receiver configured to receive a wireless communication including traffic environment information, the traffic environment information including status information of a respective one of at least one traffic participant, wherein the status information includes presence information, current activity information, and statistical behavior information,
   wherein the statistical behavior information of the respective traffic participant is determined over a period of time by an internet of things device associated with the respective traffic participant, wherein the statistical behavior information includes a behavior pattern of the respective traffic participant and a corresponding statistical information specific to the respective traffic participant indicating a probability of the respective traffic participant performing the behavior pattern; and
   a controller configured to generate a command signal for the vehicle based on the statistical behavior information.

2. The control device of claim 1, further comprising:
   a processor configured to determine a reliability valuation of the statistical behavior information of the respective participant; and
   the controller configured to generate the command signal for the vehicle based on the statistical behavior information and the reliability valuation.

3. The control device of claim 2, wherein the processor is further configured to determine the reliability valuation based also on a characteristic of a source of the status information.

4. The control device of claim 2, wherein the command signal commands the vehicle to reduce its speed or to display a warning indication for a driver, wherein the warning indication comprises at least one of a tactile, sound or visual signal.

5. The control device of claim 2, wherein the receiver is configured to receive a first set of traffic environment information and a second set of traffic environment information, the processor is configured to determine a first reliability valuation for the first set of traffic environment information and a second reliability valuation for the second set of traffic environment information, wherein the first reliability valuation is different from the second reliability valuation, and wherein the controller is configured to generate the command signal based on the first set of traffic environment information, the second set of traffic environment information, the first reliability valuation, and the second reliability valuation.

6. The control device of claim 2, wherein the processor is further configured to determine the reliability valuation based also on whether the status information includes a functional safety tag which indicates that a source of the status information is reputable.

7. The control device of claim 2, wherein when the reliability valuation is above a predetermined reliability threshold, the command signal automatically commands the vehicle to decelerate and when the reliability valuation is below the predetermined reliability threshold, the command signal commands the vehicle to provide a warning indication to a driver of the vehicle.

8. The control device of claim 2, wherein the behavior pattern includes at least one of: suddenly stops when moving, suddenly moves when not in motion, or suddenly changes direction when moving.

9. The control device of claim 2, wherein the processor is further configured to apply self-learning to determine a reliability level of a source of the status information.

10. The control device of claim 2, wherein the receiver is configured to receive reliability information including a first reliability level of the status information and wherein the processor is configured to determine based on previously received reliability information a second reliability level of the status information, and determine the reliability valuation based on averaging the first reliability level and the second reliability level.

11. The control device of claim 2, wherein the receiver is configured to receive reliability information indicating a reliability level of a source of the status information, and the processor is further configured to determine the reliability valuation based also on the reliability level of the source.

12. The control device of claim 11, wherein the receiver is configured to receive the reliability information indicating the reliability level of the source of the status information from a different source than the source of the status information.

13. The control device of claim 2,
wherein the presence information includes a position information of the respective traffic participant, and
wherein the current activity information includes a current motion direction of the respective traffic participant.

14. The control device of claim 13,
wherein the reliability valuation of the status information includes a reliability level associated with the presence information and another reliability level associated with the statistical behavior information, and wherein the reliability level and the another reliability level are determined based on the type of information.

15. The control device of claim 14,
wherein the statistical behavior information includes a plurality of the behavior pattern and a corresponding respective statistical information for each of the plurality of the behavior pattern,
wherein the statistical behavior information includes a number of the plurality of the behavior pattern, and
wherein each respective behavior pattern includes a priori information of statistical behavior associated with the respective traffic participant and the corresponding respective statistical information is specific to the respective traffic participant indicating a respective probability of the respective traffic participant performing the respective behavior pattern.

16. The control device of claim 2,
wherein the status information includes a user type information and an age information of the respective traffic participant,
wherein the user type information identifies whether the respective traffic participant is a human or an animal.

17. A method for controlling a vehicle comprising:
receiving traffic environment information, the traffic environment information including status information of a respective one of at least one traffic participant, wherein the status information includes presence information, current activity information, and statistical behavior information,
wherein the statistical behavior information of the respective traffic participant is determined over a period of time by an internet of things device associated with the respective traffic participant, wherein the statistical behavior information includes a behavior pattern of the respective traffic participant and a corresponding statistical information specific to the respective traffic participant indicating a probability of the respective traffic participant performing the behavior pattern; and
generating a command signal for the vehicle based on the statistical behavior information.

18. The method of claim 17, further comprising:
determining a reliability valuation of the behavior pattern of the respective traffic participant based on the corresponding statistical information; and
generating the command signal comprises generating the command signal for the vehicle based on the statistical behavior information and the reliability valuation.

19. The method of claim 18, comprising determining the reliability valuation based also on a characteristic of a source of the status information.

20. The method of claim 18, wherein the status information includes a reliability information indicating a reliability level of a source of the status information, and the processor is further configured to determine the reliability valuation based also on the reliability level.

* * * * *